United States Patent Office 3,226,291
Patented Dec. 28, 1965

3,226,291
METHOD FOR PROTECTING GROWING PLANTS AGAINST ANIMAL DAMAGE
John H. Rediske, 120 N. Barner Drive, and William H. Lawrence, 3802 Mayberry, both of Centralia, Wash.
No Drawing. Filed Aug. 23, 1962, Ser. No. 218,833
6 Claims. (Cl. 167—46)

This invention deals with a novel process by which growing plants are made unpalatable as food for wild animals. More particularly, the invention deals with the novel means for repelling animals from excessive feeding on silvicultural and agricultural crops.

Damage to the foliage of silvicultural and agricultural crops by the feeding of wild mammals ranging from small rodents to large game species is a serious problem in many regions of the United States, Canada, Europe, Australia and other parts of the world. It is only recently that farm and forest interests in the United States have become aware of the great extent of wildlife damage, and it has been calculated that the loss to wildlife of Douglas-fir growing stock on tree farms of a single company for the year 1956 amounted to over $800,000. It has been further estimated that if wildlife damage to timber in the Douglas-fir region of the northwestern United States could be accurately measured, it would total $12,000,000 to $15,000,000 annually. In the agricultural field it has been estimated for two Pennsylvania counties for the year 1951 that over 180,000 damage to crops occurred because of the ravages of deer. Thus, there is clear evidence for the great need for a means to protect our forests and farm crops against animal attack.

One approach to controlling the adverse effects of animals depredations is by the use of chemical repellents. During the past decade thousands of chemicals have been appraised in an effort to develop external repellent coatings that are effective and economical. Of the compounds evaluated, trinitrobenzeneaniline, a complex of zinc dimethyldithiocarbamate with cyclohexylamine, tetramethylthiuramdisulfide, and several other compounds have been found effective. Application of these compounds as sprays, dusts, or dips are the usual methods of application, but, of course, the rigors of wind and rain cause loss of the compounds and reduce the period of time over which they are effective. Also, there is no protection to the root system which might be attacked by rodents, nor to new untreated growth.

It has now been found by means of this invention that all parts of growing plants may be treated in a systemic manner by which they incorporate into their metabolism a compound which makes the whole plant unpalatable to animals. In accord with this invention growing plants are systemically treated with an octa lower-alkyl pyrophosporamide to obtain a tissue concentration in the plant of at least about 400 parts per million of the green plant weight. The advantages of this process are manifold, e.g., conditioning of the plants to be repellent to animals while possessing low toxicity to the plants, long residual effect, ease of treatment, and good economics for successful treatment.

The invention is particularly useful and effective for protecting tree seedlings, such as Douglas-fir seedlings, against the ravages of wildlife species including rabbits and rodents. In the planting of forests the seedlings are carefully placed in the ground, but frequently fail to attain maturity because the young roots, bark, and foliage of the seedlings serve as food for the wild animals in the area. By means of this invention satisfactory protection to important species of deciduous and coniferous trees may be obtained. While all woody plants may be protected by means of this invention, its use will be directed primarily to the protection of tree seedlings in reforestation and silviculture programs.

The octa lower-alkyl pyrophosphoramides which are useful in this invention are those compounds having the chemical structure:

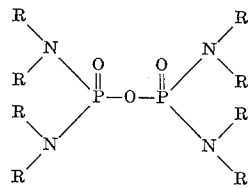

where R is a lower-alkyl radical, e.g., methyl, ethyl, propyl and butyl. Such compounds are disclosed and a process for their preparation given in U.S. 2,810,757. Of these compounds the octamethyl compound is best known as a systemic insecticide in Europe under the generic name Schradan, after its inventor, G. Schrader (B.I.O.S. Final Report No. 714, 1947). In the United States this compound is more commonly referred to as OMPA, an abbreviation for octamethylpyrophosphoramide. When used as a systemic insecticide, OMPA is used at concentrations of 60 to 100 parts per million or less which are much lower concentrations than those employed in this invention. At these lower concentrations any repellent effect to feeding animals is inadequate for plant protection and, as will be seen in the examples, at least about 400 parts per million of the green plant weight is required for a repellent effect an animals. Thus, the basis of this invention is to introduce into the plant a sufficient quantity of systemic agent that will condition animals to recognize after an initial experience that treated plants are disagreeable, unpalatable or repellent to them. After initial or limited feeding the animals develop an aversion to treated plants which causes them to avoid further feeding on plants treated with OMPA or its above defined derivatives.

For the purpose of illustrating this invention, we will refer to OMPA in the following discussion and examples.

Because OMPA is systemically absorbed by the plant, treatment of the plant may be made in any one of several ways. For example, the plant may be sprayed with a solution or dispersion of OMPA and the metabolism of the plants will effect absorption. However, such a foliage treatment technique is not considered the most effective means of applying OMPA as a repellent because the OMPA uptake by the foliage of the plant is not always rapid or complete enough by this method. For this reason, the preferred technique for the process of this invention is to provide a soil application of OMPA in the root zone of the plant and thus provide a reservoir of the active compound which is constantly and readily available to the plant metabolism. Also, in this way, effective repellent concentrations can be maintained within the plant for periods in excess of one year depending on dosage, soil type and water table. Within this period the seedlings, including the new growth, are protected against animal attack because they are repellent and unpalatable as a source of food. The means by which the reservoir of OMPA in the soil is obtained may be by simple injection equipment, used after the seedlings are planted, or by a water soluble capsule or tablet containing OMPA with or without a carrier which may be placed in the root area of the plant. The technique of using the capsule is generally preferred and it is further preferred to simply drop one or more OMPA-containing capsules into the soil when the seedling is planted.

These capsules are readily made from gelatine or other water soluble capsules conventionally used in the veterinary field. The capsules are usually packed with a solid comprising an inert granular carrier and OMPA. Number 11 gelatine capsules containing an equivalent of 1 cc. of technical grade OMPA have been successfully used. After placing in the soil, the gelatine begins to dissolve and in a few days the OMPA is released and is available to the growing plant. Dosage is predetermined by tests on potted plants for typical soil types. The OMPA is rapidly absorbed by the roots and translocated throughout the plants.

The following examples will serve to more fully illustrate the invention:

TEST PROCEDURES

A. *Cultural and analytical procedures.*—Douglas-fir seedlings used in the absorption and translocation studies were grown from seed collected from a single tree. Seeds were placed in moist perlite and allowed to grow until the stem had elongated and the cotyledons had fully developed. Seedlings were transferred to eight-liter nutrient culture pans, six seedlings per pan. Seedlings were suspended from plastic coated plywood tops covering the nutrient container, which contained a continuously aerated modified Hoagland's solution with 3 parts per million of chelated iron (iron salt of ethylene diamine tetracetic acid). This modified Hoagland's solution contains 117.5 parts per million potassium, 100 parts per million of calcium, 24.3 parts per million of magnesium, 15.6 parts per million of phosphorus as phosphates, 107 parts per million nitrogen as nitrates, and 32 parts per million of sulfur as sulfates. Solution pH was adjusted to 5.0. Original volumes of nutrient solutions were maintained at 8 liters per culture by addition of distilled water every two days and at this time pH was also adjusted. Nutrient solutions were changed every two weeks.

The plants were cultured for 8 weeks after germination at which time they were placed in the growth chamber under uniform conditions. The chamber was kept at a temperature of 30° C. dry bulb and 20° C. wet bulb during the day and 20° and 150 dry and wet bulb respectively at night. The root temperature was maintained at 24° C. and the light intensity was 2000 ft. candles on a 16 hour day.

Technical grade OMPA of at least 95% purity and radioactive OMPA with a $P^{32}$ tracer were added to the nutrient solutions at the rate of 19 microcuries per liter with the appropriate concentration of non-radioactive OMPA. When applications were made to the foliage, the chemicals were premixed and added as a 20 lambda drop of water containing about 14 microcuries of $P^{32}$ in 12 mg. of OMPA. This gave a volume concentration of about 600,000 parts per million of OMPA in each drop. Alternatively, a 100 lambda drop was applied to the foliage as an oil-water emulsion containing 28 microcuries of $P^{32}$ in 24 mg. of OMPA, 10 lambda of stove oil (clean, white) and 2 lambda of emulsifier made up of volume with water. The latter solution contained 240,000 parts per million OMPA. At the time of harvest one plant from each experimental group was used for an autoradiograph. Those plants used for analysis were separated into various tissue samples and weighed. Each tissue sample was homogenized with acetone in a high speed homogenizer. The homogenate was extracted three times, decanting the supernate after centrifugation from each extraction. The extract was reduced in volume by evaporation from one to five ml. depending upon the activity. One hundred lambda of each extract was placed on a filter paper impregnated with mineral oil as described by Cook (Journ. Assoc. Off. Agr. Chem., vol. 37, pp. 987–989, 1954). The chromatograms were developed in an acetone, alcohol, water solvent (1:1:2). After development they were dried in air and placed on a sheet of X-ray film for 1–4 weeks for autoradiography or the spot was excised and counted for total activity. The acetone extract seemed to contain only the OMPA and closely related degradation products, if any. The products of complete degradation were removed by this extraction procedure. Thus a total count of the acetone extract was used as an indication of the OMPA present in each sample. Radioisotope analyses were made with a windowless proportional counter of approximately a 50% geometry.

Chemical analyses were conducted using gas chromatography. Samples were extracted by mixing the tissue with twice its weight of water and macerating for approximately 3 minutes. The fibrous plant residue was removed by filtration and centrifugation. The tissues were decanted after centrifugation. The process was repeated 3 times. The OMPA was extracted from the water with an equal volume of chloroform. The volume of the chloroform was reduced to 1 ml. by evaporation and a 10 lambda aliquot injected into the gas chromatography unit. Peak areas were compared with previously prepared known volumes.

Chemical analyses were also conducted by degrading OMPA to the dialkyl amine and a spectrophotometer determination made of this product.

B. *Bio-assay procedures.*—Laboratory rabbits from an inbred strain were used to evaluate the repellent effects of systemic OMPA. Previous repellent trials established that reactions of these rabbits in bio-assays are similar to reactions of wild-caught snowshoe rabbits. Experimental animals were held in individual outdoor pens. Prior to evaluating a systemic treatment, test rabbits were conditioned to feeding on Douglas-fir seedlings. When normal seedlings were readily accepted, testing was started.

A bio-assay consisted of comparing the acceptance as food of systemically treated seedlings and normal seedlings during a 10-day period by one rabbit. The acceptance of 7 systemic concentrations (60 parts per million, 150 parts per million, 250 parts per million, 400 parts per million, 500 parts per million, 750 parts per million and 1000 parts per million) of OMPA were tested. The bio-assay of each concentration was replicated at least twice. Systemically treated seedlings for bio-assay were produced by the nutrient culture technique described. For a bio-assay 35 inches of stems in 5 to 7 pieces of both treated and untreated seedlings were offered a test rabbit. Each piece was the main stem of a seedling with roots and lateral branches removed. Seedlings were stapled in an erect position to a feeding stand. The number of inches of stems clipped and eaten of both treatments was recorded daily. Behavior patterns of test animals were also noted. Fresh material was offered each day during the 10-day test. During each bio-assay a sustaining ration of a standard pelleted rabbit food was offered to the test animals.

RESULTS

*Absorption and translocation studies.*—It was found that generally the absorption is proportional to the nutrient concentration of OMPA within the range of 10 to 1000 part per million. During the eleven day experimental period the concentration obtained in the roots was slightly higher than that in the crown. This fact with the observation that the concentration in the foliage is only slightly less than that in the nutrient solution, indicates that the absorption of OMPA by Douglas-fir is rapid and uninhibited. There was no evidence of toxicity to the plant even at 1000 parts per million nutrient concentration. First visual signs of phytotoxicity appear at a tissue concentration of about 2000 parts per million OMPA. A 3000 parts per million tissue concentration of OMPA is lethal to the plants. At 1000 parts per million of OMPA in the nutrient solution the tissue concentration in the foliage of the plants contained about 200 parts per million after a 10-day absorption period and that in the roots was about 500 parts per million.

Autoradiograms of representative seedlings grown in OMPA concentrations of 10, 100 and 1000 parts per million show uniform distribution of OMPA throughout the tops of the seedlings regardless of the concentration in which the seedlings were grown. Relative concentrations were not demonstrated by these autoradiograms since the same $P^{32}$ concentration was added to each cuture regardless of the OMPA concentration.

To determine if the activity found in the acetone extract of the tissues was OMPA, paper chromatograms were prepared. An autoradiogram of a chromatogram of the acetone extract of plants grown in solution concentrations of 10 and 100 parts per million OMPA showed that spots from the extract from the roots are very similarly positioned to the chromatographed spot for technical OMPA. There is some elongation of the spots from the OMPA extracted from the leaves and this may be due to a partial degradation of the OMPA to products still biologically active but having a slightly different Rf value from the parent material.

*Example 1*

The following Table I indicates the results that are obtained on laboratory rabbits using the bio-assay test method described above:

TABLE I.—PERCENT ACCEPTANCE BY LABORATORY RABBITS OF DOUGLAS-FIR SEEDLINGS SYSTEMICALLY TREATED WITH OMPA AT VARYING TISSUE CONCENTRATIONS

|  | Tissue Concentration of OMPA (p.p.m. of the green plant weight) | | | | | | |
| --- | --- | --- | --- | --- | --- | --- | --- |
|  | 60 | 150 | 250 | 400 | 500 | 750 | 1,000 |
|  | Percent Diet Accepted | | | | | | |
| Treated | 74.3 | 100.0 | 82.4 | 29.2 | 27.1 | 9.3 | 19.2 |
| Control | 70.9 | 100.0 | 89.6 | 94.6 | 99.0 | 90.0 | 88.6 |
| All Diets | 72.6 | 100.0 | 86.0 | 62.0 | 63.0 | 49.6 | 53.3 |

The above data clearly indicate that at a concentration of 60 parts per million, 150 parts per million, and 250 parts per million of OMPA in the plant tissue, repellency to animals is not evident, but at 400 parts per million of OMPA or above it is quite definite. A concentration of 400 parts per million of OMPA is considered a minimum threshold in tree seedlings for positive repellent action to animals. No mortality was evidenced among the animals during the tests, although one rabbit showed symptoms suggestive of organic phosphate poisoning after feeding on seedlings containing 500 parts per million of systemic OMPA.

*Example 2*

Following the essential details of the above testing procedure, two mountain beavers are given a 10-day food supply of 15 inches each of OMPA treated and untreated Douglas-fir seedlings. At a foliage concentration of 600 parts per million of OMPA these rodents readily differentiate between treated and untreated seedlings, as shown in Table II.

TABLE II.—REPELLENT EFFECTS OF OMPA TREATED DOUGLAS-FIR SEEDLINGS ON MOUNTAIN BEAVER

| Treatment | Seedlings Offered (inches) | Average Consumption (inches) | Percent Consumed |
| --- | --- | --- | --- |
| OMPA | 150 | 20 | 13.3 |
| Control | 150 | 120.0 | 80.2 |

*Example 3*

Snowshoe hares are subjected to the above described tests. At a foliage concentration of 800 parts per million of OMPA the test animals clearly distinguish between the test and control seedlings as is seen in the following Table III.

TABLE III.—REPELLENT EFFECT OF OMPA TREATED DOUGLAS-FIR SEEDLINGS ON SNOWSHOE HARES

| Animal | Seedlings Offered (inches) | Consumption (inches) | Percent Consumed |
| --- | --- | --- | --- |
| 1 | 90 OMPA | 8.8 | 9.8 |
|   | 90 Control | 71.5 | 79.4 |
| 2 | 120 OMPA | 8.5 | 7.1 |
|   | 120 Control | 80.1 | 66.8 |
| 3 | 90 OMPA | Developed complete aversion to treated and untreated seedlings after one feeding. | |
|   | 90 Control | | |

*Example 4*

Daily rations of 7.5 inches each of OMPA treated and untreated Douglas-fir seedlings with a sustaining ration of rabbit food are given to two bush rabbits. At a foliage concentration of 800 parts per million OMPA the rabbits differentiate between treated and untreated seedlings. There is also observed an erratic feeding of the untreated seedlings indicating the development of an aversion to all seedlings.

*Example 5*

As in the above described tests, laboratory rabbits are given daily rations of black cottonwood tree seedlings some of which are systemically treated with OMPA. Analysis of the treated seedlings shows a greater concentration of OMPA in the foliage than in the stem of the plant, the average tissue concentration being slightly in excess of 1000 parts per million. The rabbits consume only 22.6% of the OMPA treated seedlings compared to 68.8% consumption of the untreated seedlings. There is further evidence of their regular distribution of OMPA in the seedling in the rabbits' preference for the stem of the plant rather than the foliage which contains a 5-fold greater OMPA concentration.

*Example 6*

A. *Preparation of capsules.*—125 pounds of granular inert clay having a particle size range between 16–30 Tyler mesh is charged into a cylindrical blender approximately 3 feet in diameter and 7 feet long. This blender is equipped with a diagonally placed hollow shaft so as to give a wobbling motion to the drum when it is rotated. The shaft is hollow so that liquid can be injected into the interior during blending and there are 4 atomizing nozzles on the shaft in the interior of the blender. After the blender is charged with the granular clay, rotation is started and 2.9 gallons of technical 95% OMPA (weight 9.5 lbs. per gallon) are atomized onto the clay under pressures between 50 and 60 p.s.i. requiring a period of about 5 minutes for the impregnation. The mixture of granules and OMPA is blended for an additional 10 minutes after all of the OMPA has been introduced. This procedure results in uniform impregnation of the clay granules.

Standard 0.5 oz. (No. 11) gelatine capsules are filled with the OMPA-impregnated granular clay. Each capsule contains an equivalent of 5.3 grams of the OMPA-impregnated granules for an equivalent of approximately 1 cc. of 95% active agent. The gelatine caps are sealed by wetting the joint of the cap and body of the capsules with a small amount of water which causes fusion of the gelatine caps to the bodies.

Later the filled capsules are put into an open tumbler and sprayed with aluminum paint lacquer. The use of this aluminum paint lacquer coating protects the capsule against damp weather and prevents sticking during shipping or handling.

B. *Use of capsules in field.*—An area of about 3 acres is planted with approximately 2000 three-year-old Douglas-fir seedlings averaging 12–16 inches in height. As each seedling is planted, two capsules prepared as described above are placed at the bottom of the planting hole. After approximately 60 days, analysis of foliage of test seedlings shows a tissue concentration of approximately 1,000 parts per million OMPA.

It will be understood that the techniques and methods of this invention are applicable to a wide variety of seedling trees. In fact, any type of woody plant may be protected against animal damage by this invention, including deciduous varieties as well as conifers. Although plants larger than seedlings may be treated with OMPA or with other octa lower-alkyl pyrophosphoramides to render them repellent to animals, the most significant and economic value of the invention is in treatment of forest tree seedlings in reforestation and silviculture programs.

The effectiveness of the agents in the plant manifests itself against all warm blooded animals, including wildlife species such as lagomorphs and rodents. Some examples of animals which may be affected are rabbits or hares, mountain beaver (*Aplodontia rufa*), meadow vole (*Microtus* spp.), pocket gopher (*Thomomys* spp.), ground squirrels (*Citellus* spp.), and the like.

It will be understood that numerous changes and modifications may be made from the above description and examples without departing from the spirit and scope of the invention.

We claim:

1. A method for protecting plant life against damage by warm blooded animals which comprises systemically introducing into the tissues of the plant to be protected at least about 400 parts per million of the green plant weight of a compound having the structure

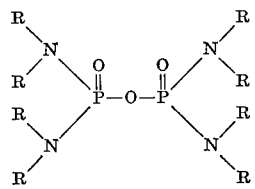

where R is lower-alkyl, whereby said plant is made repellent to said animals.

2. A method for protecting tree seedlings against damage by warm blooded animals which comprises systemically introducing into the tissues of the seedling to be protected between about 400 parts per million and about 2000 parts per million of the green plant weight of a compound having the structure

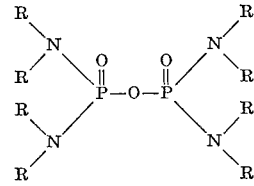

where R is lower alkyl.

3. The method of claim 2 where R is methyl.

4. A method of protecting conifer seedlings against damage by rodents and lagomorphs which comprises systemically introducing into the tissues of said seedlings between about 400 and about 2000 parts per million of octamethylpyrophosphoramide.

5. A method for protecting tree seedlings against animal damage by placing in the root zone of said seedlings a reservoir of octamethylpyrophosphoramide sufficient for said octamethylpyrophosphoramide to be absorbed and translocated throughout said tree in an amount between about 400 parts per million and about 2000 parts per million of the green plant weight.

6. The method of claim 5 wherein the octamethylopyrophosphoramide is introduced in the root zone in a water soluble capsule.

References Cited by the Examiner

UNITED STATES PATENTS

| 2,759,300 | 8/1956 | Hartley | 47—1 X |
| 2,810,757 | 10/1957 | Lanham | 260—545 |
| 2,814,636 | 11/1957 | Stahmann. | |

FOREIGN PATENTS 786,083  11/1957  Great Britain.

OTHER REFERENCES

Chemical Abstracts, vol. 46, column 5723–d (1952): Biochemistry of Organic Phosphorus Insecticides. I. Mammalian Metabolism of . . ., Schradan.

Chemical Abstracts, vol. 47, column 2417–C (1953): Toxicity of Economic Poisons Toward Man and Warm-blooded Animals.

Chemical Abstracts, vol. 52, column 16,618–E, Oct. 10, 1958: Acute Experimental Poisoning with Organophosphorous Insecticides.

Ripper, W. E., the Outlook for Systemic Insecticides, in Down to Earth (magazine), published by Dow Chemical Co., Midland, Mich., vol. 6, No. 3, winter 1950, pages 13–16.

ABRAHAM G. STONE, *Primary Examiner.*

T. GRAHAM CRAVER, *Examiner.*